US012638284B2

(12) United States Patent　　　(10) Patent No.:　US 12,638,284 B2
Rappenecker　　　　　　　　　　　(45) Date of Patent:　May 26, 2026

(54) DIFFERENCE MAKER TAPE MEASURE AND METHOD OF USE

(71) Applicant: Dennis Rappenecker, Rhinelander, WI (US)

(72) Inventor: Dennis Rappenecker, Rhinelander, WI (US)

( * ) Notice: Subject to any disclaimer, the term of this patent is extended or adjusted under 35 U.S.C. 154(b) by 385 days.

(21) Appl. No.: 18/489,893

(22) Filed: Oct. 19, 2023

(65) Prior Publication Data

US 2025/0027759 A1　　　Jan. 23, 2025

Related U.S. Application Data

(60) Provisional application No. 63/514,609, filed on Jul. 20, 2023.

(51) Int. Cl.
G01B 3/10　　　　　(2020.01)
G01B 3/1003　　　　(2020.01)

(52) U.S. Cl.
CPC .................................. G01B 3/1003 (2020.01)

(58) Field of Classification Search
CPC .............................. G01B 3/1003; G01B 3/004
USPC ................................ 33/494, 679.1, 759, 771
See application file for complete search history.

(56) References Cited

U.S. PATENT DOCUMENTS

| | | | | |
|---|---|---|---|---|
| 239,691 | A | * | 4/1881 | Appleton ................ G01B 3/004 33/494 |
| 3,173,214 | A | * | 3/1965 | Daller ...................... B25H 7/00 33/678 |

| | | | | |
|---|---|---|---|---|
| 3,270,421 | A | * | 9/1966 | Jones ................... G06G 1/0021 33/759 |
| 3,812,588 | A | | 5/1974 | Bennett |
| 4,031,360 | A | | 6/1977 | Soule, Jr. |
| 4,194,703 | A | | 3/1980 | Roe |
| 5,062,215 | A | * | 11/1991 | Schlitt ................. G01B 3/1003 33/759 |
| 5,251,382 | A | * | 10/1993 | Hellar ................... G01B 3/004 33/759 |
| 5,335,421 | A | * | 8/1994 | Jones, Jr. .............. G01B 3/004 33/759 |
| 5,435,074 | A | | 7/1995 | Holevas |
| 5,913,586 | A | * | 6/1999 | Marshall ............... G01B 3/004 33/759 |
| 6,070,338 | A | * | 6/2000 | Garity ................. G01B 3/1084 33/759 |

(Continued)

*Primary Examiner* — George B Bennett

(74) *Attorney, Agent, or Firm* — Brennan, Manna & Diamond, LLC

(57)　　　　　　　　ABSTRACT

A tape measure device including a housing with branding options, a lock tab mechanism for controlling tape extension/retraction, and compatibility with different tape lengths is disclosed. The tape measure blade incorporates three distinct sets of ascending and descending numbers, each tailored for specific measurement scenarios. The first set offers traditional ascending linear measurements, identical to a standard tape measure, simplifying common length assessments. The second set (i.e., descending set) is engineered for calculating differences (i.e., section cut-offs) in 8-foot building materials, while the third set (i.e., descending set) caters to 12-foot materials. The aforementioned sets enable users to quickly identify and cut precise lengths without the need for extensive tape measure blade extension. The device's design optimizes ease of use, portability, and secure storage through a belt clip.

8 Claims, 4 Drawing Sheets

(56)          References Cited

U.S. PATENT DOCUMENTS

| | | | |
|---|---|---|---|
| 6,467,183 B2 * | 10/2002 | Larsen ..................... | G01B 3/20 |
| | | | 33/679.1 |
| 6,470,582 B1 * | 10/2002 | Renko ................... | G01C 15/00 |
| | | | 33/476 |
| 6,530,159 B2 * | 3/2003 | Tarver, III ............. | G01B 3/004 |
| | | | 33/759 |
| 7,343,694 B2 * | 3/2008 | Erdfarb ................. | G01B 3/004 |
| | | | 33/759 |
| 7,730,631 B2 * | 6/2010 | Delaurier ............. | G01B 3/1003 |
| | | | 33/759 |
| 9,651,348 B2 * | 5/2017 | French ................. | G01B 3/1003 |
| 11,156,445 B2 | 10/2021 | Levisohn et al. | |
| 2002/0017031 A1 * | 2/2002 | Tarver, III ............. | G01B 3/004 |
| | | | 33/759 |
| 2004/0055174 A1 * | 3/2004 | Hirsch, Jr. ........... | G01B 3/1003 |
| | | | 33/759 |
| 2004/0117997 A1 * | 6/2004 | Karageorge ............. | G01B 3/02 |
| | | | 33/494 |
| 2020/0080827 A1 | 3/2020 | Eun | |

* cited by examiner

DIFFERENCE MAKER TAPE MEASURE AND METHOD OF USE

CROSS-REFERENCE TO RELATED APPLICATION

The present application claims priority to, and the benefit of, U.S. Provisional Application No. 63/514,609, which was filed on Jul. 20, 2023, and is incorporated herein by reference in its entirety.

FIELD OF THE INVENTION

The present invention generally relates to the field of tape measures. More specifically, the present invention relates to a novel tape measure designed to measure materials (i.e., building materials) through the difference of previously known quantities. The tape measure includes three sets of measurement markers that have conventional 1-inch markings, pre-determined markings related to 8-foot and 12-foot pieces of building material. The tape measure enables users to identify markings from 96-inches and 144-inches (i.e., backwards or in descending order) at the beginning of the tape measure, saving steps and energy by enabling the user to measure a shorter difference to make measurements on longer material. Accordingly, the present disclosure makes specific reference thereto. Nonetheless, it is to be appreciated that aspects of the present invention are also equally applicable to other like applications, devices, and methods of manufacture.

BACKGROUND

By way of background, standard tape measures are essential tools in construction and carpentry. Tape measures are used to measure the dimensions of walls, floors, and other structures. Tape measures are also used to measure the length of materials, such as lumber and pipes. Tape measures are not only used indoors but outdoors, such as gardens, patios, and other outdoor spaces. Standard tape measures come in a variety of lengths, from 12 inches to 400 feet. Standard tape measures are typically made of metal or cloth and have markings in inches and centimeters. Some tape measures also have markings in other units, such as millimeters or meters.

Standard tape measures have limitations, especially when used for measuring long distances. When a standard tape measure is extended over long distances, the tape can experience bend or stretch. This is primarily due to the tape's own weight, which can cause the tape to sag or stretch and become deformed from its original shape. When working on building projects, especially those involving various cuts and adjustments, individuals often need to calculate the difference between known measurements. This requires mental math skills, and errors can occur during these calculations. Inaccurate measurements can result in components not fitting properly, leading to structural issues, gaps, or other problems that can compromise the project's stability and safety. Inaccurate measurements can also result in wasted time and/or materials. When using a standard tape measure for multiple measurements across a long surface, the tape measure is repositioned repeatedly while performing calculations. This process can be time-consuming, inefficient, and inaccurate. Individuals desire an improved tape measure to simplify measurements on longer materials.

Therefore, there exists a long-felt need in the art for an improved tape measure device that simplifies measurements and eliminates inaccuracies on longer materials. Additionally, there is a long-felt need in the art for an improved tape measure device that eliminates mistakes associated with mental math when trying to measure the difference between building materials. Moreover, there is a long-felt need in the art for a tape measure that enables users to measure a shorter difference to make measurements on longer material. Further, there is a long-felt need in the art for a tape measure that saves time, steps, and reduces mistakes in measuring long distances. Finally, there is a long-felt need in the art for a tape measure designed to measure materials through the difference of previously known quantities.

The subject matter disclosed and claimed herein, in one embodiment thereof, comprises a tape measure device. The tape measure device includes a housing that has a tape measure extending from an opening in the housing. The tape measure has a tape measure blade featuring three sets of numbers for facilitating measurements, a first set of sequential numbers, beginning with "1" at the free end of the blade and sequentially increasing by one with a 1-inch interval, a second set of numbers, the second set of numbers decreasing at each inch mark by one and starting from "96" at the free end of the tape measure blade, coinciding with the first set numbers to enable differential measurements, and a third set of numbers designed for measuring the difference between points on a 12-foot piece of building material, the third set of numbers commencing with "144" and decreases by one at 1-inch intervals, further coinciding with the first set numbers and the second set numbers to facilitate differential measurements.

In this manner, the tape measure device of the present invention accomplishes all of the foregoing objectives and provides users with a tape measure device that improves accuracy and prevents users from making inaccurate measurements. The device features three sets of marking that eliminate mistakes associated with mental math when trying to measure the difference between building materials. The tape measure saves time, steps, reduces mistakes, and lengthens the life of the tape, as it would not have to be used to measure a long number when the shorter difference can be measured instead.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a difference maker tape measure device. The tape measure device further comprising a portable and lightweight housing bearing a logo or indicia for marketing and branding purposes, a lock tab configured to slide along a sliding portion, wherein the lock tab is selectively movable between a locked position and an unlocked position, a flat base integrated into the housing, facilitating stable placement of the device on a flat surface, and a belt clip disposed on a rear surface of the housing for convenient storage, transport, and attachment to objects.

In yet another embodiment, a tape measure is disclosed. The tape measure comprising a tape measure blade featuring three sets of numbers for facilitating measurements, a first set of sequential numbers, beginning with "1" at one inch from the free end of the blade and sequentially increasing with a 1-inch interval, a second set of numbers, the second set of numbers decreasing at each inch mark and starting from "96" at the free end of the tape measure blade, coinciding with the first set numbers to enable differential measurements, and a third set of numbers designed for measuring the difference between points on a 12-foot piece of building material, the third set of numbers commencing with "144" and decreases at 1-inch intervals, further coinciding with the first set numbers and the second set numbers to facilitate differential measurements.

In a further embodiment, the tape blade includes at least ⅛-inch marks, ¼-inch marks, and ½-inch marks placed between consecutive 1-inch marks for enhanced measurement precision.

In yet another embodiment, a method for using a difference maker tape measure device to measure and make a cut on building material is disclosed. The method includes the steps of providing a difference maker tape measure device with an improved tape measure featuring three sets of numbers, including a first set of sequential numbers starting from "1" at one inch, a second set of numbers designed for measuring the difference between points on an 8-foot piece of building material, and a third set of numbers designed for measuring the difference between points on a 12-foot piece of building material, obtaining a 12-foot piece of drywall, equivalent to 144 inches in length, with the intention of making a cut at a specific distance along the material, positioning a tape blade hook of the difference maker tape measure device at one end of the 12-foot piece of drywall, aligning the first 1-inch mark with corresponding markings at 95 inches and 143 inches along the tape blade. Measuring a length equal to difference of 144 inches and the specific distance and making a cut at the identified point.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
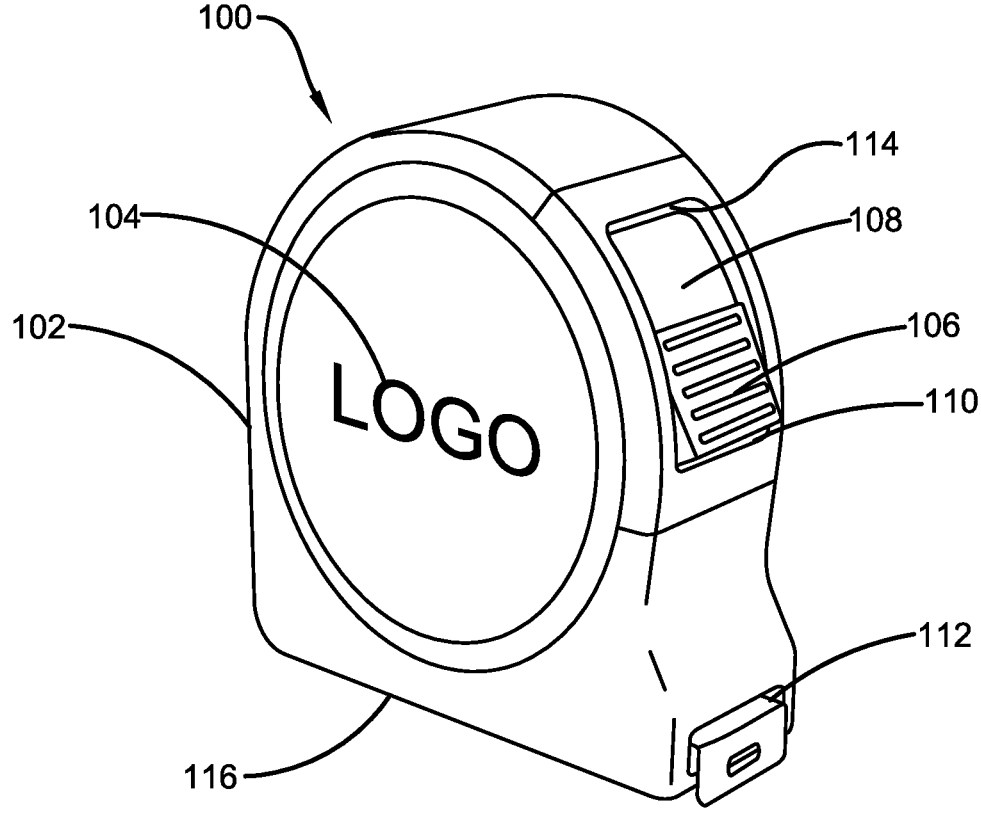
FIG. 1 illustrates a perspective view of a difference maker tape measure device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved tape measure device that simplifies measurements and eliminates inaccuracies on longer materials (i.e., building materials). Additionally, there is a long-felt need in the art for an improved tape measure device that eliminates mistakes associated with mental math when trying to measure the difference between building materials. Moreover, there is a long-felt need in the art for a tape measure that enables users to measure a shorter difference to make measurements on longer material. Further, there is a long-felt need in the art for a tape measure that saves time, steps, and reduces mistakes in measuring long distances. Finally, there is a long-felt need in the art for a tape measure designed to measure materials through the difference of previously known quantities.

The present invention, in one exemplary embodiment, is a difference maker tape measure for measuring building materials by measuring the difference of known quantities. The device will include a tape measure with at least three (3) sets of numbers. The first set of numbers will be the same or similar to those on a normal tape measure. The second set of numbers will be used for measuring the difference between an 8-foot piece of building material, such as drywall, plywood, or sheathing. The third set of numbers will measure backwards for a 12-foot piece of building material. The tape measure saves time/steps, reduces mistakes, and lengthens the life of the tape, as the tape measure is not used to measure a long number when the shorter difference can be measured instead.

Figure 2:
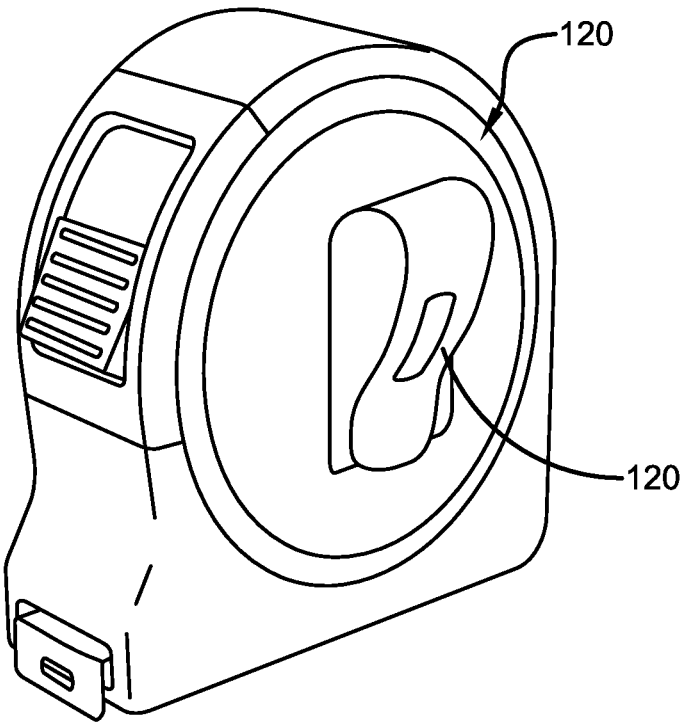
FIG. 2 illustrates a rear perspective view of difference maker tape measure device of the present invention in accordance with the disclosed structure.

Referring initially to the drawings, FIG. 1 illustrates a perspective view of the difference maker tape measure device of the present invention in accordance with the disclosed structure. The difference maker tape measure device 100 is a specialized measuring device designed for measuring building materials. The device 100 is portable, lightweight, and includes a housing 102. The housing 102 can have a logo or any other indicia 104 thereon for marketing and branding purposes. A lock tab 106 is disposed in a sliding portion 108 of the housing 102 wherein the lock tab 106 is configured to slide along the sliding portion 108. The lock tab 106 can be on a locked position 110 for preventing the tape from extending out of a tape extension opening 112. The lock tab 106 can be slid to an unlocked position 114 for enabling the tape to extend out of the tape extension opening 112. The housing 102 can come in different sizes and colors to accommodate tape measures of different lengths and different sizes. The housing 102 has a flat base 116 enabling the device 100 to be easily placed on a surface. For easily storing and transporting the difference maker tape measure device 100, a belt clip 118 is disposed on a rear or side surface 120 of the housing 102, as illustrated in FIG. 2. The device 100 can be easily clipped to an object using the belt clip 118.

Figure 3:
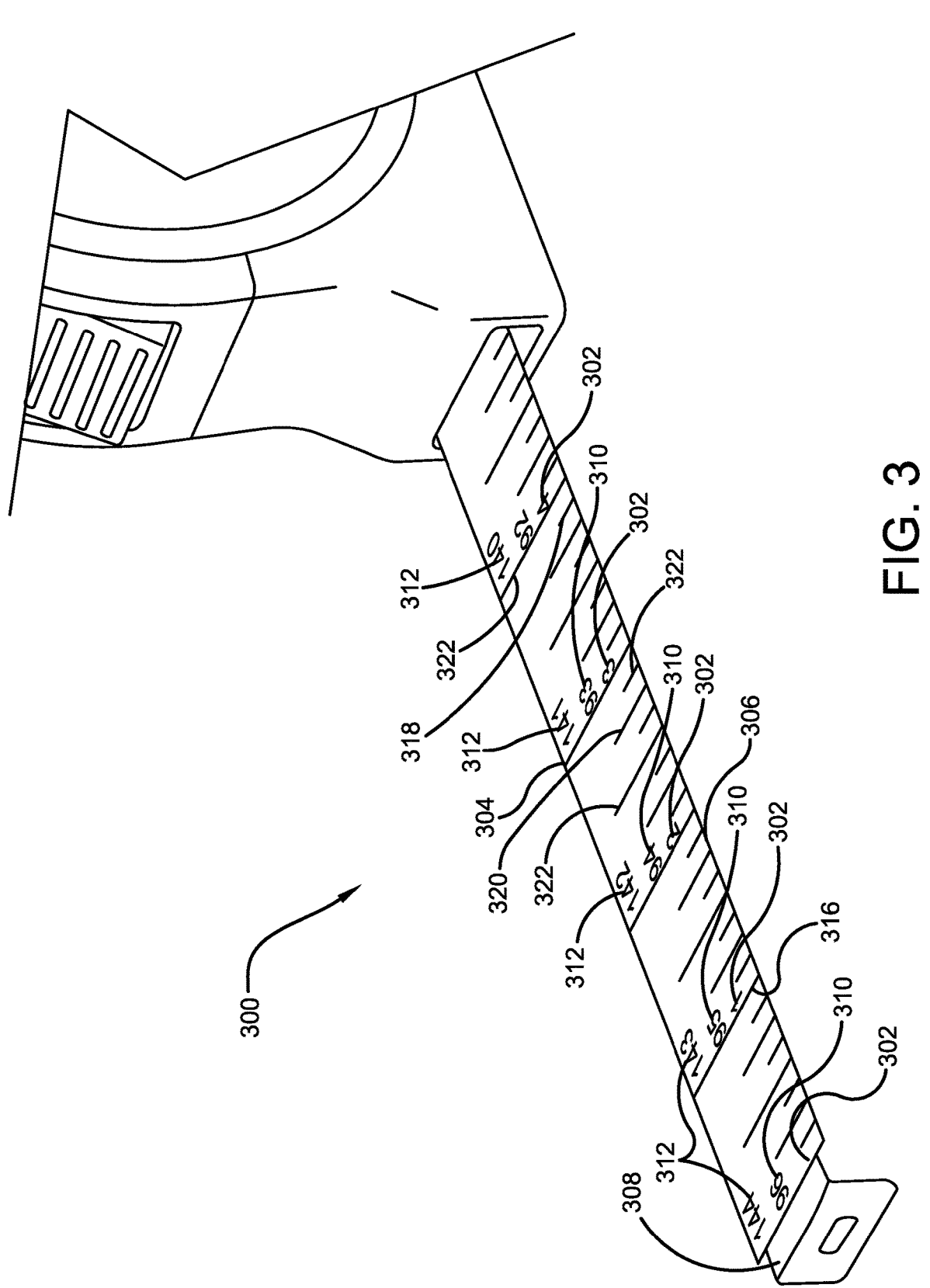
FIG. 3 illustrates a perspective view of a portion of the tape measure extending out from the opening and showing three sets of numbers in accordance with the disclosed structure.

FIG. 3 illustrates a perspective view of a portion of the tape measure extending out from the opening and showing three sets of numbers in accordance with the disclosed structure. The tape measure 300 of the present invention is novel and includes three sets of different numbers for easy measurement of longer distances and objects. A first set of sequential numbers 302 starting from "1" at the one-inch marking (i.e., starting from zero at a terminal end of the tape) is printed on the tape measure blade 304. The first set of numbers 302 is identical or similar to those found on a regular or standard tape measure. The first set of numbers 302 enable users to take traditional linear measurements and enable users to measure lengths in feet, inches, fractions of inches, millimeters, centimeters, or any other unit of measurement commonly used for construction or carpentry work. The numbers 302 can include, in ascending order, 1-inch intervals (shown by numeral 316) along the length of the tape blade 304 and include consecutive and ascending numbers starting with "1" at one inch from the tape hook 308 (i.e., starting at zero at a terminal end of the tape measure blade 304). The first set of numbers 302 can be printed along the first longitudinal edge 306 of the blade 304.

A second set of numbers 310 is printed on the tape blade 304 and are specifically designed for measuring the difference between an 8-foot piece of building material. The second set of numbers 310 enables users to calculate the difference between two points on an 8-foot piece of material. The second set of numbers 310 starts from "96" at the terminal, or free end, of the tape measure blade 304. The second set of numbers 310 decreases (i.e., descending order) at each inch mark and thus "1" of the first set 302 coincides with the "95" of the second set 310. Similarly, "2" of the first set 302 coincides with "94" of the second set 310, and "3" of the first set 302 coincides with "93" of the second set 310, and so on.

A third set of numbers 312 is printed on the tape blade 304 and are specifically designed for measuring the difference between a 12-foot piece of building material. The third set of numbers 312 are printed in descending order along the second longitudinal edge 314 of the tape blade 304. As illustrated, the second set 310 is positioned between the first set 302 and the third set 312. The third set 312 starts from "144" (144 inches) and individual third set numbers are positioned at 1-inch marks in descending order. The "143" of the third set 312 coincides with "1" of first set 302 and "95" of the second set 310. Similarly, "142" of the third set 312 coincides with "2" of the first set 302 and "94" of the second set 310. The tape blade 304 can also include additional increments, for example, ⅛" mark lines 318, ¼" mark lines 320, and ½" mark lines 322 between consecutive 1-inch mark lines.

EXAMPLE

In the present example for using the tape measure device 100, including the improved tape measure 300, in one exemplary arrangement, it is considered that an individual has a 12-foot piece of drywall, which is equivalent to 144 inches. A cut is to be made at 134⅝" on the 12' piece of drywall. This equates to 9⅜ inches from an edge of the drywall (i.e., 144 inches minus 134⅝ inches). But rather than doing the math, the user merely uses the third set of descending increments and marks where the tape measure reads 134⅝ inches. In this manner, the tape blade hook 308 of the difference maker tape measure device 100 is positioned at one end of the drywall which also includes first 1-inch mark ("1" of the first set 302 along with the corresponding markings at 95 inches of set two 310 and 143 inches of set three 312). To measure and cut 134⅝" on the 12' piece of drywall, an individual measures to 134⅝" along the third set 312 of markings (i.e., equivalent to 9⅜ inches from the hook 308 of the tape blade 304) and marks a cut line. Thus, the user, instead of extending the tape measure blade 304 for the full 8-foot or 12-foot length, can start at the beginning of the tape blade, identify the relevant marking set (either 96 inches or 144 inches), and then measure to the desired length from the end of the material.

In different embodiments, the tape measure blade 304 can have additional sets of numbers for specific tasks. For example, a smaller tape measure may be used by drywallers and carpenters for measuring "rips," which are narrow strips of material. The smaller tapes may include markings for counting backward (i.e., descending order) from 4 feet (48 inches), not illustrated, and 8 feet (96 inches), as illustrated in FIG. 3. This enables users to quickly measure shorter differences for these common lengths instead of extending the tape measure over the full distance, or nearly the length of the material.

Figure 4:
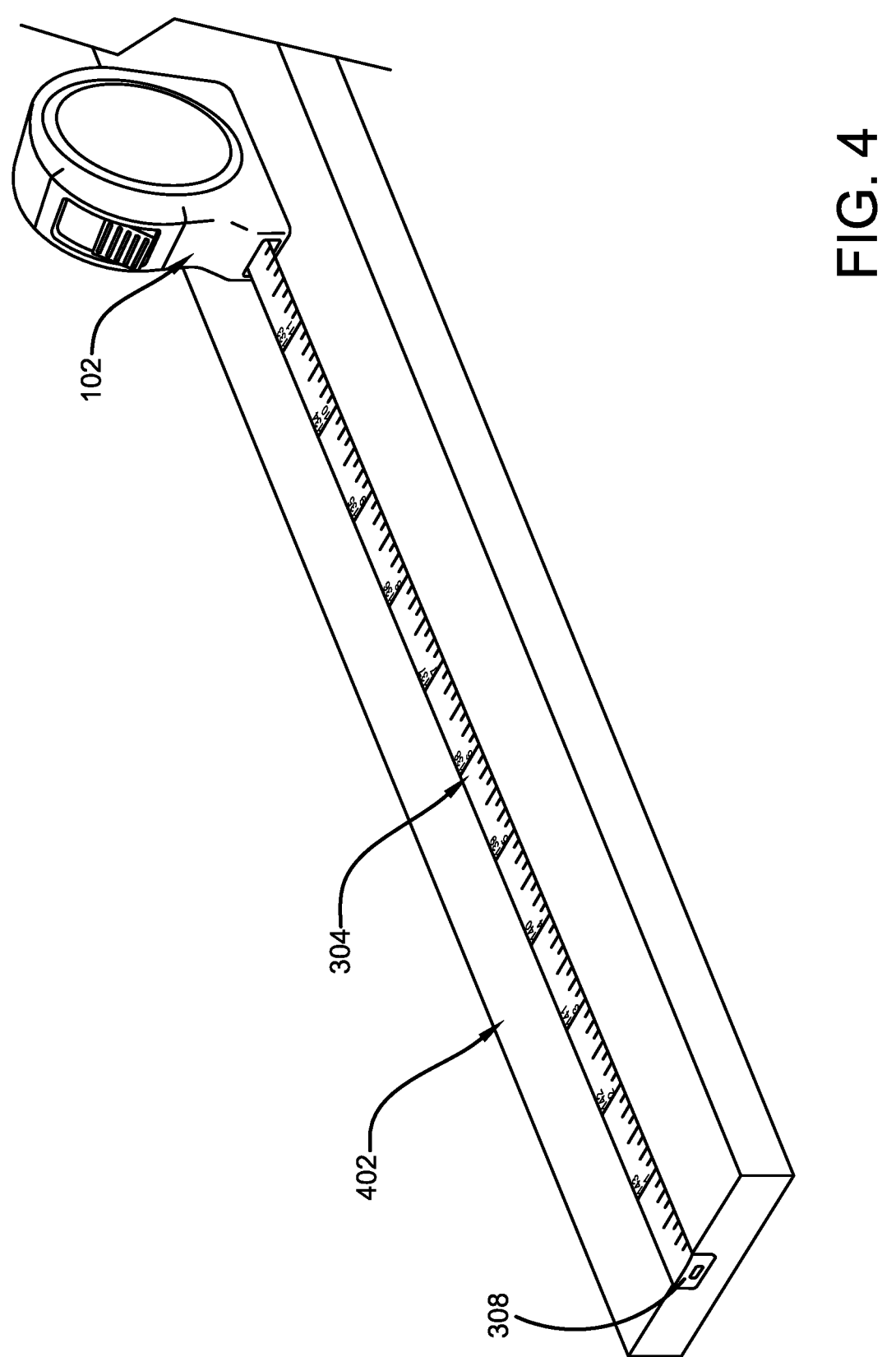
FIG. 4 illustrates a perspective view showing a user using the difference maker tape measure in accordance with the disclosed structure.

FIG. 4 illustrates a perspective view showing a user using the difference maker tape measure in accordance with the disclosed structure. As illustrated, the tape measure 100 is used for measuring the size of an object 402 by rolling out the tape blade 304 from the housing 102 of the device 100. The tape measure device 100 can be used with different sized objects, such as 8-foot pieces of building materials (i.e., drywall, plywood, sheathing), and 12-foot pieces of building materials and more.

The difference maker tape measure device of different embodiments of the present invention saves time and effort by reducing the need to extend the tape measure over longer lengths of material. Further, measuring shorter differences is easy and accurate using the tape measure device, thus, reducing the likelihood of mistakes in construction or carpentry work.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "difference maker tape measure device", "difference maker tape measure", "tape measure device", "tape measure", and "device" are interchangeable and refer to the difference maker tape measure 100 of the present invention.

Notwithstanding the foregoing, the difference maker tape measure 100 of the present invention can be of any suitable size and configuration as is known in the art without affecting the overall concept of the invention, provided that it accomplishes the above-stated objectives. One of ordinary skill in the art will appreciate that the difference maker tape measure 100 as shown in the FIGS. 1-3 are for illustrative purposes only, and that many other sizes and shapes of the difference maker tape measure 100 are well within the scope of the present disclosure. Although the dimensions of the difference maker tape measure 100 are important design parameters for user convenience, the difference maker tape measure 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tape measure device comprising:
a portable tape measure having a housing, a lock tab, and a tape;
wherein said lock tab having a sliding portion for sliding said lock tab from a first tape locking position for preventing said tape from extending from said housing to a second tape unlocking position for enabling said tape to retract into said housing; and
wherein said tape having at least two sets of sequential numbers including a first set of sequential numbers in an ascending order and a second set of sequential numbers in a descending order;
wherein the housing comprises an indicia;
wherein said first set of sequential numbers ascends from zero;
wherein said second set of sequential numbers descends from 96 inches; and further wherein said third set of sequential numbers descends from 144 inches.

2. The tape measure device of claim 1, wherein said housing having a flat base for standing said portable tape measure on a flat surface.

3. The tape measure device of claim 2, wherein said housing having a clip attached to a side surface of said housing for clipping to an object for hands-free retention.

4. A tape measure device comprising:
a portable tape measure having a housing, a lock tab, and a tape;
wherein said tape having at least three sets of sequential numbers including a first set of sequential numbers in an ascending order, a second set of sequential numbers in a descending order, and a third set of sequential numbers in a descending order;
wherein the housing comprises an indicia;
wherein the housing further comprises a clip disposed on a rear surface of the housing;
wherein said second set of sequential numbers descends from 96 inches; and
further wherein said third set of sequential numbers descends from 144 inches.

5. The tape measure device of claim 4, wherein said housing having a flat base for standing said portable tape measure on a flat surface.

6. The tape measure device of claim 4, wherein said lock tab having a sliding portion for sliding said lock tab from a first tape locking position for preventing said tape from extending from said housing to a second tape unlocking position for enabling said tape to retract into said housing.

7. The tape measure device of claim 4, wherein said first set of sequential numbers ascends from zero.

8. A tape measure device comprising:
a portable tape measure having a housing and a tape;
wherein said tape having at least three sets of sequential numbers including a first set of sequential numbers in an ascending order, a second set of sequential numbers in a descending order, and a third set of sequential numbers in a descending order;
wherein said first set of sequential numbers ascend from a starting point of zero; and
wherein the housing comprises an indicia;
wherein the housing further comprises a clip disposed on a rear surface of the housing;
wherein said second set of sequential numbers descends from 48 inches; and
further wherein said third set of sequential numbers descends from 96 inches.

* * * * *